(12) United States Patent
Greywall et al.

(10) Patent No.: US 7,403,322 B2
(45) Date of Patent: Jul. 22, 2008

(54) MEMS-BASED ALIGNMENT OF OPTICAL COMPONENTS

(75) Inventors: Dennis S. Greywall, Whitehouse Station, NJ (US); Dan Mark Marom, Howell, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 15 days.

(21) Appl. No.: 11/225,777

(22) Filed: Sep. 13, 2005

(65) Prior Publication Data
US 2007/0058899 A1 Mar. 15, 2007

(51) Int. Cl.
*G02B 26/00* (2006.01)
(52) U.S. Cl. .................. 359/291; 359/290; 359/295
(58) Field of Classification Search .............. 359/292, 359/223, 238, 290, 291, 295, 298, 225, 226
See application file for complete search history.

(56) References Cited

U.S. PATENT DOCUMENTS

| | | | | |
|---|---|---|---|---|
| 5,319,511 A | * | 6/1994 | Lin | 360/256.1 |
| 5,501,893 A | | 3/1996 | Learmer et al. | 428/161 |
| 5,629,790 A | | 5/1997 | Neukermans et al. | 359/198 |
| 6,201,631 B1 | | 3/2001 | Greywall | 359/245 |
| 6,498,870 B1 | * | 12/2002 | Wu et al. | 385/18 |
| 6,667,823 B2 | | 12/2003 | Greywall | 359/224 |
| 6,850,354 B2 | | 2/2005 | Greywall | 359/291 |
| 6,876,484 B2 | | 4/2005 | Greywall | 359/291 |
| 6,924,581 B2 | | 8/2005 | Greywall | 310/309 |
| 7,119,942 B2 | * | 10/2006 | Nathanson et al. | 359/291 |
| 2005/0134955 A1 | | 6/2005 | Greywall et al. | 359/291 |
| 2005/0157376 A1 | * | 7/2005 | Huibers et al. | 359/291 |
| 2005/0174624 A1 | | 8/2005 | Greywall | 359/290 |

OTHER PUBLICATIONS

"Wavelength-Selective 1 χ K Switches Using Free-Space Optics and MEMS Micromirrors: Theory, Design, and Implementation," by Dan M. Marom et al., J. Lightwave Technology, 2005, vol. 23 1620-1630.
U.S. Appl. No. 10/796,618, filed Mar. 9, 2004.
U.S. Appl. No. 11/095,071, filed Mar. 31, 2005.

* cited by examiner

*Primary Examiner*—David N. Spector
*Assistant Examiner*—Jack Dinh (57) ABSTRACT

A MEMS device that enables an optical subsystem (e.g., an optical switch) having an optical component optically coupled to the MEMS device via free space to achieve optical alignment between the optical component and the MEMS device without moving the optical component with respect to the stationary part of the MEMS device. In one embodiment, a MEMS device of the invention has a stationary part and a movable part movably connected to the stationary part. The movable part has a platform and a plurality of mirrors mounted on the platform, wherein (i) each mirror is adapted to move with respect to the platform independent of other mirrors and (ii) the platform is adapted to move with respect to the stationary part together with the mirrors.

14 Claims, 6 Drawing Sheets

MEMS-BASED ALIGNMENT OF OPTICAL COMPONENTS

BACKGROUND OF THE INVENTION

1. Field of the Invention

The invention relates to optical communication equipment and, more specifically, to micro-electromechanical devices for use in such equipment.

2. Description of the Related Art

Optical subsystems (e.g., switches, modulators, compensators, and equalizers) in an optical communication system often employ free-space optics (where free space may be vacuum or a volume filled with a fluid, such as gas, vapor, and/or liquid). A representative optical subsystem is assembled from individual optical components and might include an arrayed MEMS device, a diffraction grating, an array of optical fibers, and the like, mounted on a support structure and optically coupled to one another. The optical components need to be appropriately aligned to enable the subsystem to perform its intended optical function.

Even if the components of an optical subsystem are initially well aligned, e.g., at the factory or when the subsystem is deployed, over time, these components might become misaligned due to mechanical movement of the support and mounting structures, aging, optical degradation, and/or variations in ambient temperature and pressure. Disadvantageously, this misalignment might detrimentally affect the quality of optical signals, increase the bit error rate (BER), and/or even completely disable the corresponding subsystem.

SUMMARY OF THE INVENTION

Problems in the prior art are addressed, in accordance with the principles of the present invention, by a MEMS device that enables an optical subsystem (e.g., an optical switch) having an optical component optically coupled via free space to the MEMS device to achieve optical alignment between the optical component and the MEMS device without moving the optical component with respect to the stationary part of the MEMS device. In one embodiment, a MEMS device of the invention has a stationary part and a movable part movably connected to the stationary part. The movable part has a platform and a plurality of mirrors mounted on the platform, wherein (i) each mirror is adapted to rotate with respect to the platform independent of other mirrors and (ii) the platform is adapted to translate with respect to the stationary part together with the mirrors. Advantageously, MEMS devices of the invention can correct misalignment arising from various causes, e.g., factory assembly-alignment errors, movement of support and mounting structures, aging, optical degradation, and variations in ambient temperature and pressure.

According to one embodiment, the present invention is a MEMS device comprising: a stationary part; and a movable part movably connected to the stationary part, wherein the movable part comprises a platform and a plurality of mirrors mounted on the platform, wherein: each mirror is adapted to move with respect to the platform; and the platform is adapted to move with respect to the stationary part.

According to another embodiment, the present invention is an apparatus comprising first and second optical components optically coupled via free space, wherein: the first optical component comprises a MEMS device, comprising: a stationary part; and a movable part movably connected to the stationary part, wherein the movable part comprises a platform and a plurality of mirrors mounted on the platform, wherein: each mirror is adapted to move with respect to the platform; and the platform is adapted to move with respect to the stationary part.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1A:
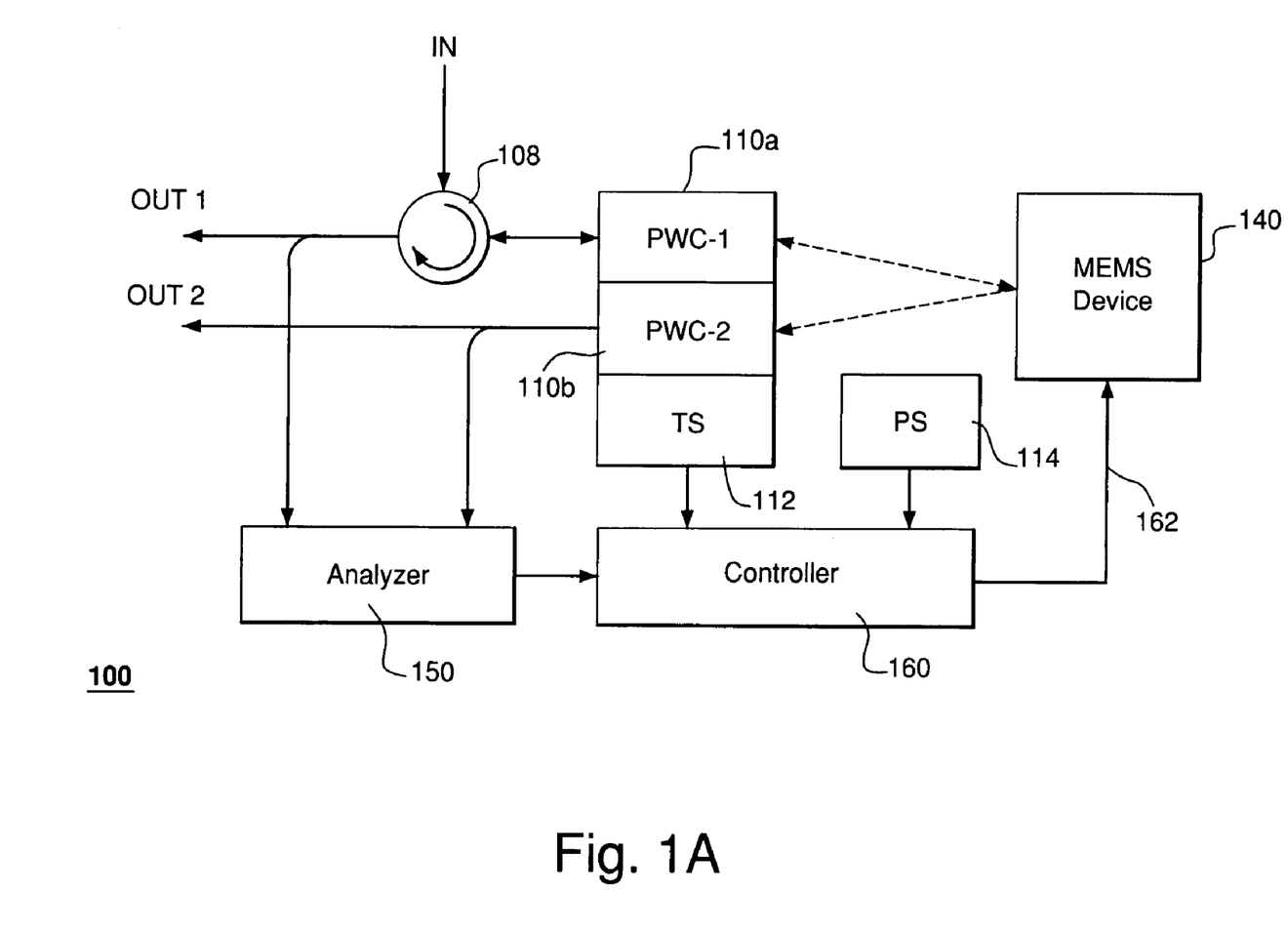
FIGS. 1A-C show an optical switch according to one embodiment of the invention.

FIG. 1 shows an optical switch 100 according to one embodiment of the invention. Switch 100 is a 1×2 wavelength-selective switch adapted to receive an optical WDM signal at its input (IN) port and selectively direct different WDM components of that signal to either one of its output (OUT1, OUT2) ports. Switch 100 has two planar waveguide circuits 110a-b and a MEMS device 140 coupled using free space optics. MEMS device 140 has an array of mirrors 142, each independently movable with respect to the stationary part of the device. Circuit 110a receives, via an optical circulator 108, the WDM signal applied to the input port, de-multiplexes that signal into separate WDM components, and directs these components to individual mirrors 142 of MEMS device 140. Each WDM component can be reflected either back to circuit 110a or toward circuit 110b by the corresponding appropriately oriented mirror 142. Circuit 110a re-multiplexes the returned WDM components and directs the resulting WDM signal, via circulator 108, to output port OUT1. Similarly, circuit 110b multiplexes the WDM components directed to it by MEMS device 140 and directs the resulting WDM signal to output port OUT2.

Figure 1B:
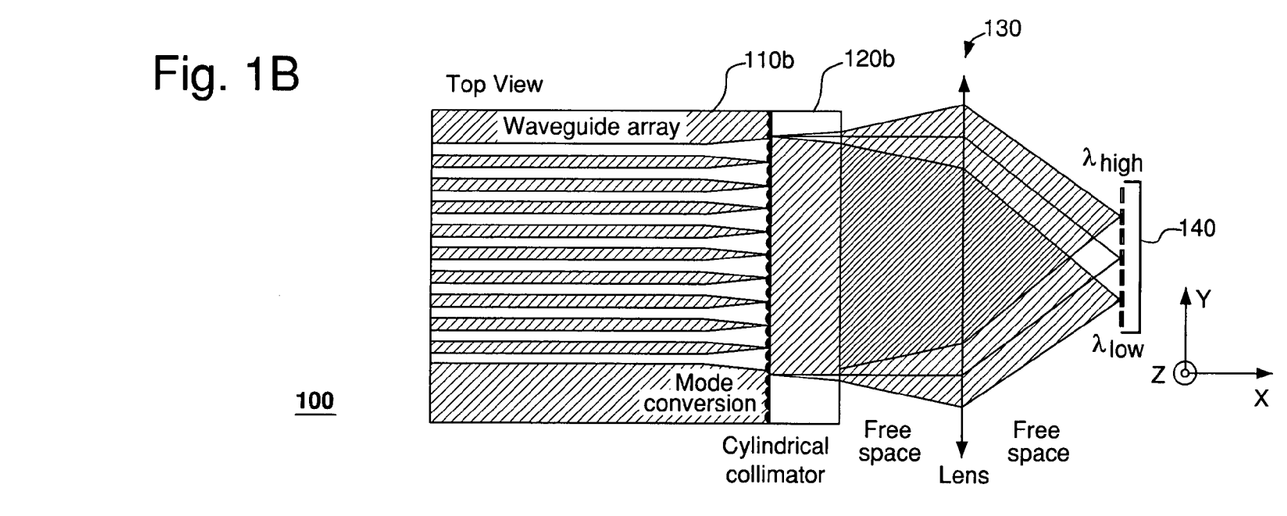
Figure 1C:
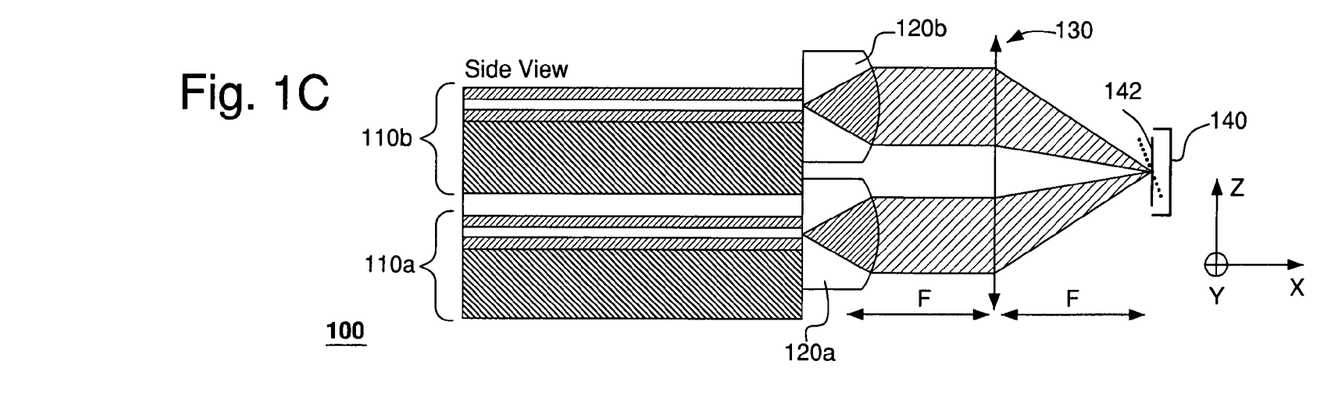

FIGS. 1B-C show top and side views, respectively, of certain optical components in switch 100. Circuits 110a-b are vertically stacked as shown in FIG. 1C and optically coupled to MEMS device 140 via lenses 120a-b and 130. Each of circuits 110a-b has a plurality of waveguides forming an arrayed waveguide grating (AWG). Terminal facets of circuits 110a-b have cylindrical collimating lenses 120a-b, respectively, each configured to reduce expansion in the Z direction of the light exiting the waveguides of the corresponding circuit and/or to focus the light returned from MEMS device 140 back into the waveguides. Different waveguides in each AWG have different lengths (not visible because FIGS. 1B-C shows only terminal portions of circuits 110a-b) selected such as to form a spectral image of the WDM signal at the back focal plane of lens 130, which is placed between lenses 120a-b and MEMS device 140.

Mirrors 142 are positioned at the back focal plane of lens 130, with each mirror designed to receive light corresponding to one WDM channel. Each mirror 142 can rotate about an axis that is parallel to the Y direction, e.g., between two positions. In a first position shown in FIG. 1C by a solid line, mirror 142 directs light received from circuit 110a to circuit 110b. In a second position shown in FIG. 1C by a dotted line, mirror 142 directs light received from circuit 110a back to that circuit. Thus, different WDM channels can be individually switched between circuits 110a-b by appropriately selecting one of the first and second positions for the corresponding mirrors 142.

Switch 100 is relatively insensitive to misalignment between the stack of circuits 110a-b and MEMS device 140 along the Z direction because each mirror 142 has a relatively large size along that direction. Similarly, switch 100 is relatively insensitive to misalignment between the stack of circuits 110a-b and MEMS device 140 along the X direction because the imaging optics having lenses 120a-b and 130 has a relatively large focal depth along that direction. However, switch 100 is relatively sensitive to misalignment between the stack of circuits 110a-b and MEMS device 140 along the Y direction because mirrors 142 have relatively small sizes and pitch along that direction, both dictated by the dispersion characteristics of the AWGs and channel spacing of the WDM signal.

Figure 2:
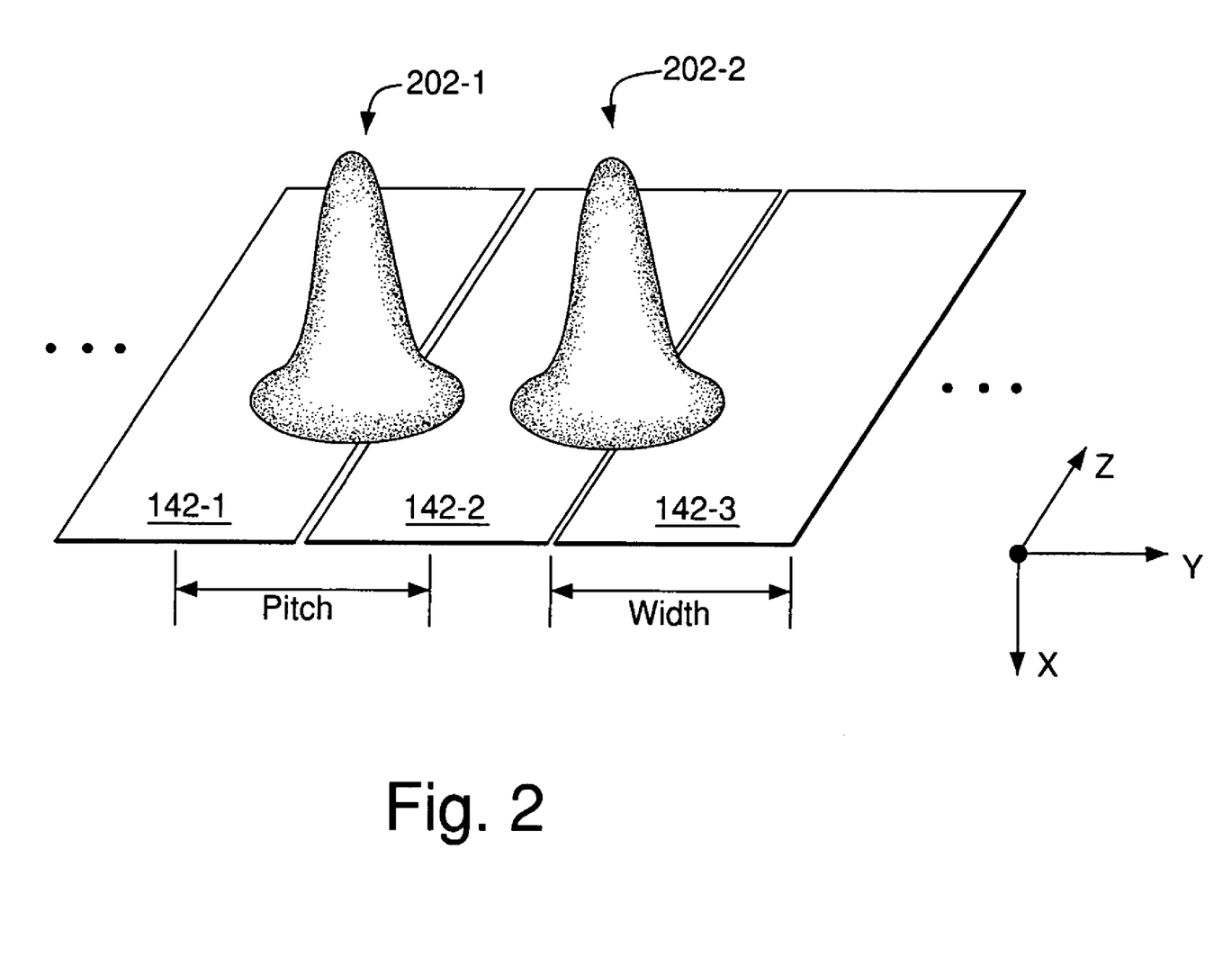
FIG. 2 schematically illustrates a typical result of misalignment between the optical beams incident on the MEMS device from the stack of planar waveguide circuits and the MEMS device in the switch shown in FIG. 1.

FIG. 2 schematically illustrates a typical result of misalignment in switch 100, along the Y direction, between optical beams incident on the MEMS device from the stack of circuits 110a-b and MEMS device 140. More specifically, FIG. 2 shows three mirrors 142 of MEMS device 140 and two Gaussian-like bell curves 202-1 and 202-2 representing intensity distributions at the mirror plane for the spectral images corresponding to two adjacent WDM channels. When circuits 110a-b and MEMS device 140 are properly aligned with respect to each other, curves 202-1 and 202-2 are centered at mirrors 142-1 and 142-2, respectively. One possible cause of the misalignment shown in FIG. 2 might be a temperature change in circuits 110a-b from a designated temperature. Such a temperature change produces a shift of curves 202-1 and 202-2 from their intended positions because it causes a refraction index change in the AWGs, which alters their dispersion characteristics and causes the spectral images of the WDM channels to form at a shifted location. Disadvantageously, the misalignment shown in FIG. 2 causes (i) signal intensity losses for individual WDM channels due to curve clipping by the mirror edges and (ii) an increased amount of inter-channel crosstalk due to curve spilling into the adjacent mirror(s).

One prior-art method of reducing misalignment of the type shown in FIG. 2 is to place switch 100 or its components into a thermostat. The thermostat temperature is usually chosen to be about 70° C. to accommodate for various field conditions and enable the switch to maintain the thermostat temperature without the use of refrigeration, by means of heating only. However, one disadvantage of this prior-art method is that it significantly increases power consumption. Another disadvantage is that this method does not correct misalignment arising from the causes other than the temperature variation, e.g., mechanical movement of the support and mounting structures, aging, optical degradation, and pressure variation.

Referring back to FIGS. 1A-C, in one embodiment MEMS device 140 is adapted to translate mirrors 142 with respect to the stationary part of the device along the Y direction. Switch 100 has a controller 160 adapted to provide a control signal 162 for MEMS device 140, based on which the MEMS device translates the mirror array, e.g., to correct optical misalignment shown in FIG. 2. Controller 160 generates control signal 162 based on one or more inputs received from a signal analyzer 150, a temperature sensor (TS) 112, and a pressure sensor (PS) 114.

In one embodiment, analyzer 150 samples one or both output signals of switch 100 via the corresponding optical taps and analyzes the spectrum of the sampled signal(s) to determine whether circuits 110a-b and MEMS device 140 are properly aligned with respect to each other. In one configuration, analyzer 150 detects characteristic ripples and/or dips corresponding to the mirror edges in the signal spectrum and communicates the spectral locations of these ripples and dips to controller 160. Controller 160, in turn, instructs MEMS device 140 via control signal 162 to shift the mirror array such that, for each WDM channel, a center wavelength of that channel hits a center portion of the corresponding mirror.

In another embodiment, controller 160 is adapted to store a calibration table listing the appropriate displacement values (e.g., with respect to a reference position) for the mirror array in MEMS device 140 as a function of temperature and pressure. The calibration table can be compiled, e.g., at the factory using a spectral analyzer similar to analyzer 150. Based on the calibration table and temperature and pressure readings provided by sensors 112 and 114, respectively, controller 160 instructs MEMS device 140 via control signal 162 to appropriately shift the mirror array, thereby correcting the misalignment produced by temperature and/or pressure deviations from the nominal operating values.

Figure 3:
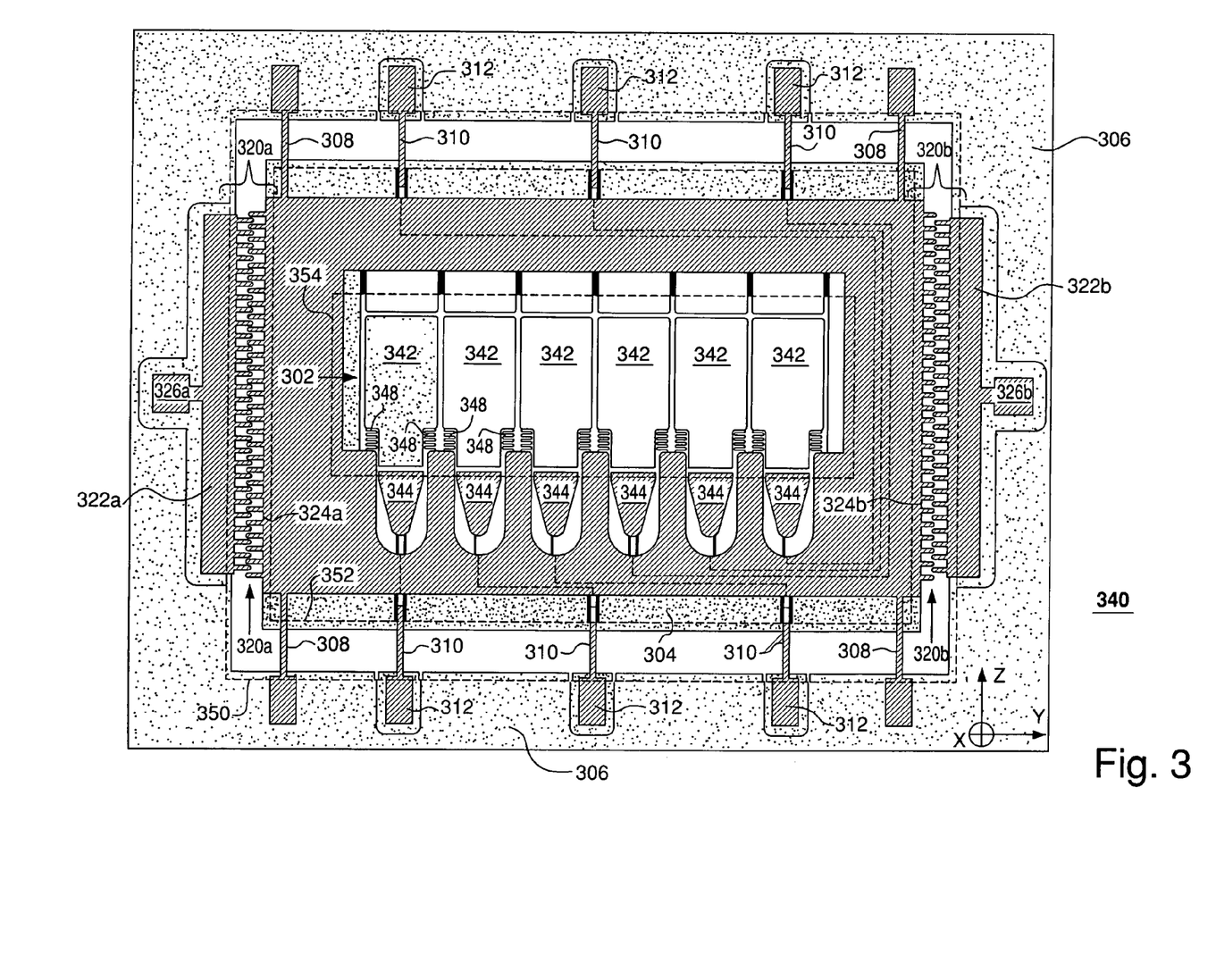
FIG. 3 shows a top view of a MEMS device that can be used in the switch of FIG. 1 according to one embodiment of the invention.

FIG. 3 shows a top view of a MEMS device 340 that can be used as MEMS device 140 according to one embodiment of the invention. Device 340 has an array 302 of mirrors 342, only six of which are shown in FIG. 3 for simplicity. Array 302 is mounted on a movable platform 304, which is movably connected to a stationary frame 306 by a plurality of springs 308 and 310. Illustratively, four springs 308 and six springs 310, each having a rod-like shape, are shown. Device 340 further has two comb actuators 320a-b located at opposite sides of platform 304. Each of actuators 320a-b has a stationary portion 322(a, b) attached to frame 306 and a movable portion 324(a, b) attached to platform 304. Portion 322 is electrically isolated from the rest of the device structure using (known in the art) trench isolation, while portion 324 is in electrical contact via springs 308 with the normally grounded bulk portion of device 340. As a result, portions 322 and 324 of each actuator 320 can be electrically biased with respect to one another, e.g., by the application of a bias voltage to a corresponding contact pad 326.

When a bias voltage is applied to pad 326a, while pad 326b is at a ground potential, an attractive electrostatic force generated between portions 322a and 324a causes platform 304 (together with array 302) to move in the negative Y direction, with the bias voltage value and the stiffness of springs 308/310 determining the frame displacement magnitude. When the bias voltage is removed, the spring forces of springs 308 and 310 return platform 304 (together with array 302) into the initial position corresponding to the undeformed state of the springs. Similarly, when a bias voltage is applied to pad 326b, while pad 326a is at a ground potential, the attractive electrostatic force generated between portions 322b and 324b causes platform 304 to move in the positive Y direction. Therefore, by appropriately biasing actuators 320a-b, array 302 can be translated by a desired distance to correct the misalignment illustrated in FIG. 2. Advantageously, actuators 320a-b consume very little power compared to, e.g., a prior-art thermostat, and can correct misalignment arising from various causes including, e.g., factory assembly-alignment errors.

In one embodiment, array 302 is similar to one of arrayed MEMS devices disclosed in commonly owned U.S. Pat. No. 6,850,354, the teachings of which are incorporated herein by reference. Briefly, for each mirror 342, array 302 has a fringe-field (FF) actuator, including the mirror itself and an electrode 344 located in proximity to the mirror. Mirror 342 and electrode 344 are fabricated using different layers of material and, in the projection of FIG. 3, the electrode sits above the plane of the mirror. Mirror 342 has short and long ends with respect to the axis of rotation defined by two springs 348, which movably connect the mirror to platform 304. Electrode 344 can be electrically biased with respect to mirror 342 by the application of a bias voltage to a corresponding contact pad 312 located on frame 306, to which contact pad the electrode is electrically connected via the corresponding conducting track (indicated by a dashed line in FIG. 3) and spring 310. More details on supplying actuation voltages to a movable part of a MEMS device, such as platform 304 of device 340, can be found in commonly owned U.S. Pat. No. 6,924,581, the teachings of which are incorporated herein by reference.

When electrode 344 is electrically biased, the resulting electrical fringe field causes the short end of the corresponding mirror 342 to move up, toward the electrode, thereby tilting the mirror. When the electrical bias is removed, the spring forces of springs 348 return the mirror into the initial (flat) position. Because different electrodes 344 can be independently biased, different mirrors 342 can be independently rotated, e.g., between two positions needed to implement signal switching between circuits 110a-b of switch 100 (FIG. 1).

Device 340 can be fabricated, e.g., as described in the above-cited '354 and '581 patents using layered (e.g., silicon-on-insulator) wafers. Additional layers of material may be deposited onto a wafer using, e.g., chemical vapor deposition. Various parts of the devices may be mapped onto the corresponding layers using lithography. Relatively deep openings in the substrate layer (i.e., the bottom-most layer in the projection of FIG. 3), such as those indicated by dashed-line boxes 350, 352, and 354 in FIG. 3, can be formed using anisotropic DRIE etching. Additional description of various fabrication steps may be found, e.g., in U.S. Pat. Nos. 6,201,631, 5,629,790, and 5,501,893, the teachings of all of which are incorporated herein by reference. Representative fabrication-process flows can be found, e.g., in U.S. Pat. Nos. 6,667,823 and 6,876,484 and U.S. patent application Ser. Nos. 10/741,491 (filed on Dec. 19, 2003), 10/772,847 (filed on Feb. 5, 2004), 10/796,618 (filed on Mar. 9, 2004), and 11/095,071 (filed on Mar. 31, 2005), the teachings of all of which are incorporated herein by reference.

Figure 4:
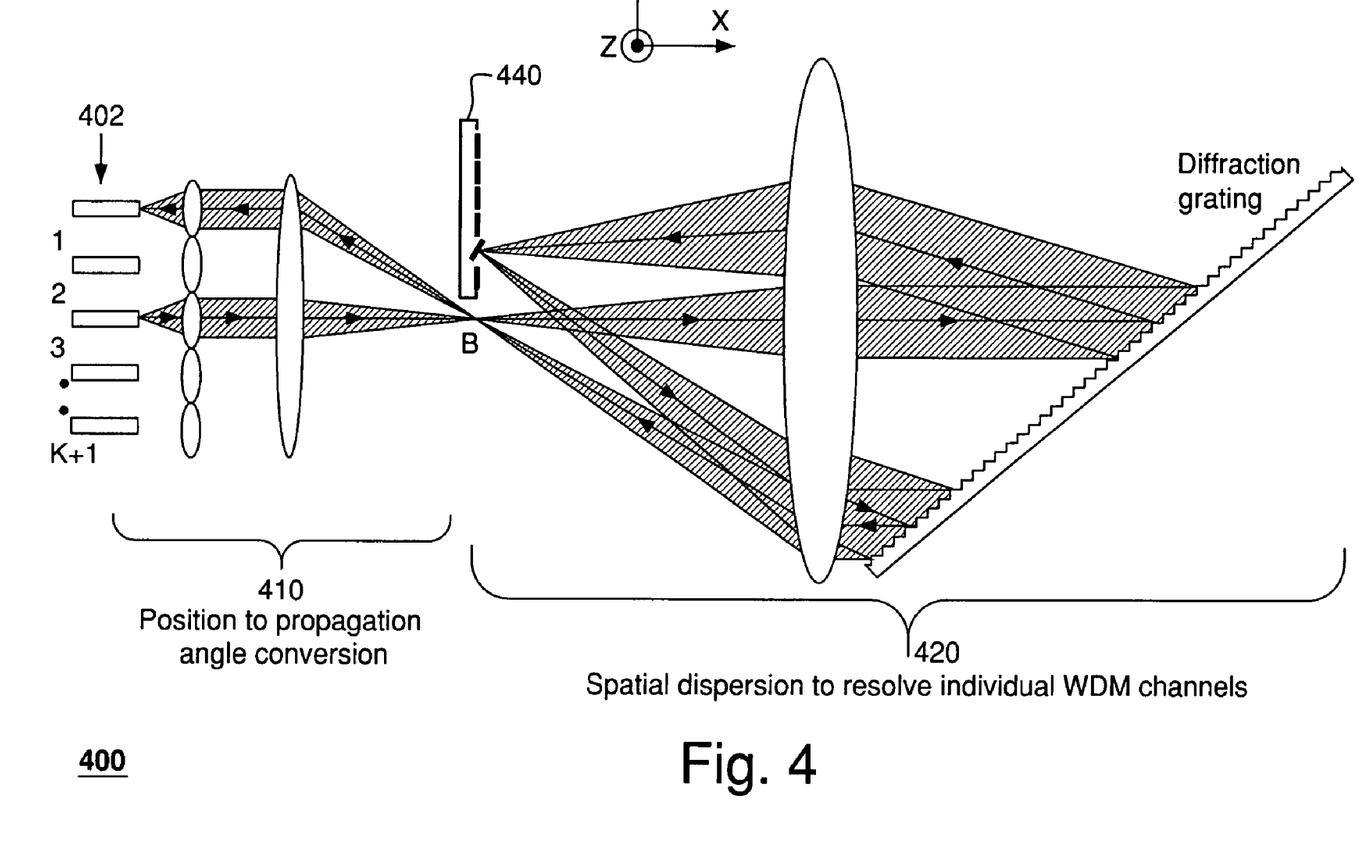
FIG. 4 shows an optical switch according to another embodiment of the invention.

FIG. 4 shows an optical switch 400 according to another embodiment of the invention. More specifically, switch 400 is a 1×K wavelength selective switch adapted to receive an optical WDM signal at one of its fiber ports 402 and selectively distribute different WDM components between one or more of K other fiber ports 402. FIG. 4 illustratively shows a representative optical path for one WDM component, which is directed from fiber port 402-3, which is configured to serve as an input port, to fiber port 402-1, which serves as one of the K output ports.

Switch 400 has two sub-assemblies 410 and 420. Sub-assembly 410 is designed to image the tips of fiber ports 402 onto a common spot, labeled B in FIG. 4, and convert the distinct spatial locations of the fiber ports into distinct angular propagation directions, at position B, for the corresponding optical signals. Sub-assembly 420 is designed to spectrally disperse light emanating from spot B and image light corresponding to different WDM channels onto different mirrors of a MEMS device 440. Each mirror in MEMS device 440 can be tilted, with the tilt angle determining the fiber port to which the reflected light couples upon being imaged back onto the plane having the tips of fiber ports 402. More details on sub-assembles 410 and 420, their respective components, and functions can be found in an article by D. M. Marom, et al., published in J. Lightwave Technology, 2005, vol. 23, pp. 1620-1630, the teachings of which are incorporated herein by reference.

Similar to switch 100 of FIG. 1, switch 400 is relatively sensitive to misalignment in the Y direction, of the type shown in FIG. 2, between sub-assemblies 410 and 420 and MEMS device 440. To correct this misalignment, MEMS device 440 incorporates a movable platform similar to platform 304 of MEMS device 340. In one embodiment, switch 400 has a controller analogous to controller 160 of switch 100 and one or more instances of an analyzer and sensors analogous to analyzer 150 and sensors 112 and 114, respectively. Based on the feedback signal(s) produced by the analyzer and/or sensor(s), the controller instructs MEMS device 440 to appropriately translate its movable platform to achieve proper alignment of its mirrors with the spectral images produced by sub-assemblies 410 and 420.

Figure 5:
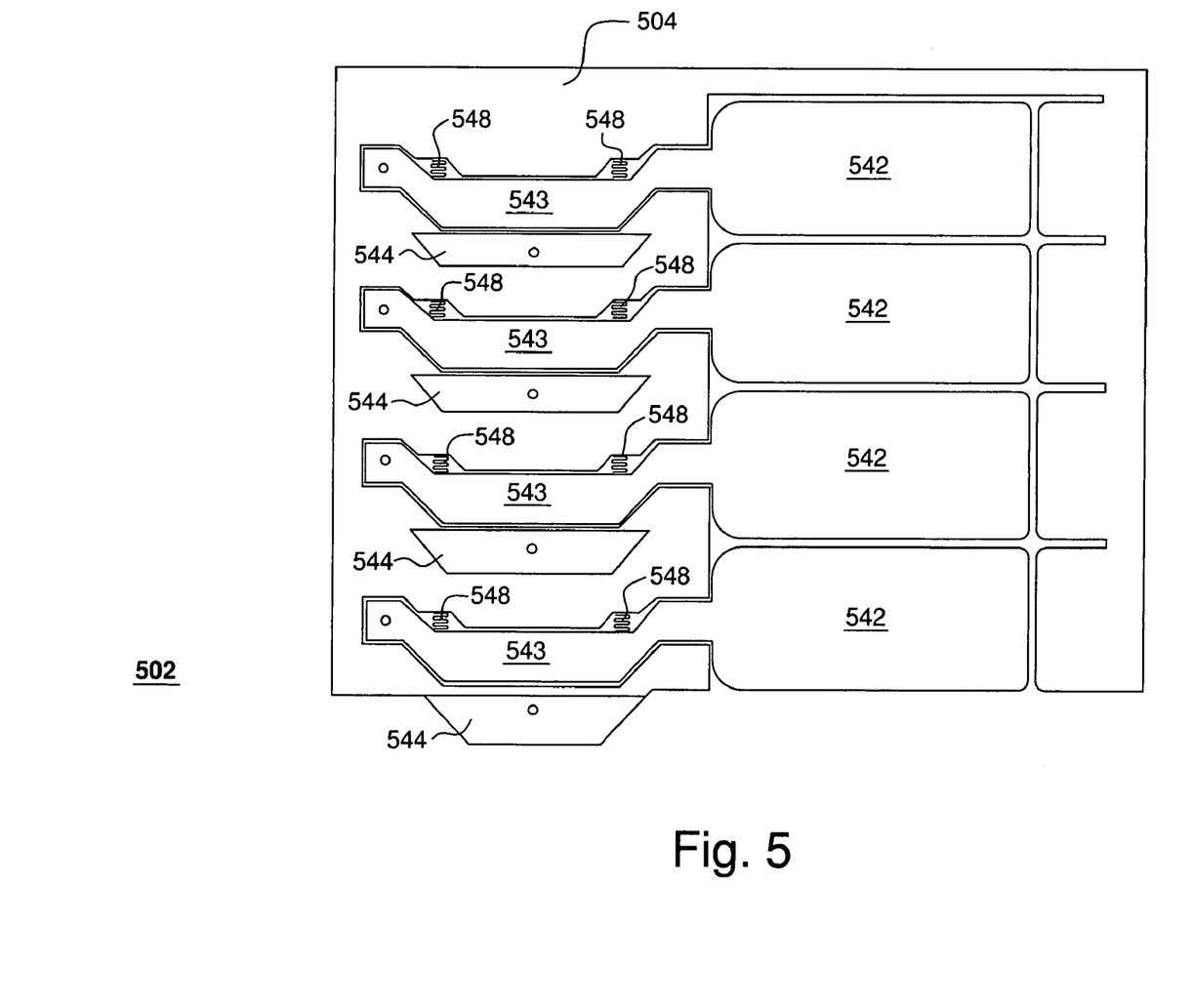
FIG. 5 shows a top view of a mirror array that can be used in the MEMS device of the switch shown in FIG. 4 according to one embodiment of the invention.

FIG. 5 shows a top view of a mirror array 502 that can be used in MEMS device 440 of switch 400 according to one embodiment of the invention. In general, array 502 is analogous to array 302 of MEMS device 340 and is similarly mounted on a movable platform 504 (not fully shown in FIG. 5) analogous to movable platform 304 of that MEMS device. However, one difference between arrays 302 and 502 is the orientation of the mirror rotation axis with respect to the mirror-array line (i.e., the line along which mirrors 342 and 542 are lined up in arrays 302 and 502, respectively). More specifically, in array 302, each mirror 342 is adapted to rotate about an axis that is parallel to the array line. In contrast, in array 502, each mirror 542 is adapted to rotate about an axis that is perpendicular to the array line.

Each mirror 542 has a relatively long handle 543 that is movably connected to platform 504 by two springs 548, which define the mirror rotation axis. For each mirror 542, array 502 has a fringe-field (FF) actuator similar to the FF actuator for mirror 342 in array 302. More specifically, each FF actuator in array 502 has an electrode 544 located in proximity to the corresponding handle 543. When electrode 544 is electrically biased, the resulting electrical fringe field causes handle 543 to move up, toward the electrode, thereby tilting mirror 542. When the electrical bias is removed, the spring force of springs 548 returns the mirror into the initial (flat) position. More details on mirror arrays similar to array 502 can be found, e.g., in the above-cited '354 patent.

While this invention has been described with reference to illustrative embodiments, this description is not intended to be construed in a limiting sense. Although embodiments of the invention were described in reference to optical switches, they can similarly be utilized in other optical subsystems (e.g., modulators, compensators, equalizers, etc.) of an optical communication system. Various surfaces may be modified, e.g., by metal deposition for enhanced reflectivity and/or electrical conductivity or by ion implantation for enhanced mechanical strength. Differently shaped mirrors, plates, platforms, frames, pads, drives, electrodes, and/or actuators may be implemented without departing from the scope and principle of the invention. Springs may have different shapes and sizes, where the term "spring" refers in general to any suitable elastic structure that can recover its original shape after being distorted. Arrayed mirrors can be designed to have an axis of rotation that has an arbitrary orientation with respect to an array line. Two-dimensional mirror arrays can be used similar to the linear mirror arrays shown, e.g., in FIGS. 3 and 5. Various modifications of the described embodiments, as well as other embodiments of the invention, which are apparent to persons skilled in the art to which the invention pertains are deemed to lie within the principle and scope of the invention as expressed in the following claims.

For the purposes of this specification, a MEMS device is a device having two or more parts adapted to move relative to one another, where the motion is based on any suitable interaction or combination of interactions, such as mechanical, thermal, electrical, magnetic, optical, and/or chemical interactions. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electromechanical systems) devices, MOEMS (micro-opto-electromechanical systems) devices, micromachines, Microsystems, and devices produced using microsystems technology or microsystems integration.

Although the present invention has been described in the context of implementation as MEMS devices, the present invention can in theory be implemented at any scale, including scales larger than micro-scale.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A MEMS device, comprising:
   a stationary part; and
   a movable part movably connected to the stationary part, wherein the movable part comprises a platform and a plurality of mirrors mounted on the platform, wherein:
      each mirror is adapted to move with respect to the platform; and
      the platform is adapted to translate with respect to the stationary part.

2. The invention of claim 1, wherein:
   the platform is adapted to translate with respect to the stationary part so that said plurality translates with respect to the stationary part together with the platform; and
   each mirror of said plurality is further adapted to rotate with respect to the platform.

3. The invention of claim 2, wherein each mirror of said plurality is adapted to rotate with respect to the platform independent of other mirrors of said plurality.

4. The invention of claim 1, further comprising a first actuator adapted to produce a first displacement of the platform with respect to the stationary part along a first direction, wherein the first actuator comprises:
   a first portion attached to the stationary part; and
   a second portion attached to the platform, wherein electrical bias of the first portion with respect to the second portion results in the first displacement.

5. The invention of claim 4, further comprising a second actuator adapted to produce a second displacement of the platform with respect to the stationary part along a second direction opposite to the first direction.

6. The invention of claim 1, wherein each mirror is adapted to move with respect to the platform independent of other mirrors.

7. The invention of claim 1, wherein, for at least one mirror, a fringe-field (FF) actuator is adapted to move the mirror with respect to the platform, wherein the FF actuator is fully mounted on the platform.

8. The invention of claim 1, wherein:
   the platform is movably connected to the stationary part by a plurality of springs; and
   the plurality of springs is adapted to provide at least three independent electrical leads to the platform.

9. The invention of claim 1, wherein the plurality of mirrors comprises a linear mirror away having three or more mirrors arranged along an away line.

10. The invention of claim 9, wherein each mirror in the away is adapted to rotate about a rotation axis that is substantially parallel to the away line.

11. The invention of claim 9, wherein each mirror in the array is adapted to rotate about a rotation axis that is substantially orthogonal to the array line.

12. The invention of claim 1, wherein:
   each mirror is adapted to rotate with respect to the platform independent of other mirrors;
   the platform is movably connected to the stationary part by a plurality of springs; and
   the plurality of springs is adapted to provide at least three independent electrical leads to the platform, wherein the device further comprises an actuator adapted to produce a displacement of the platform with respect to the stationary part, wherein the actuator comprises:
   a first portion attached to the stationary part; and
   a second portion attached to the platform, wherein electrical bias of the first portion with respect to the second portion results in the displacement.

13. A MEMS device, comprising:
   a stationary part; and
   a movable part movably connected to the stationary part, wherein the movable part comprises a platform and a plurality of mirrors mounted on the platform, wherein:
      each mirror is adapted to move with respect to the platform;
      the platform is adapted to move with respect to the stationary part;
      the platform is movably connected to the stationary part by a plurality of springs; and
      the plurality of springs is adapted to provide at least three independent electrical leads to the platform.

14. The invention of claim 13, wherein:
   the platform is adapted to translate with respect to the stationary part;
   each mirror is adapted to rotate with respect to the platform independent of other mirrors;
   the device further comprises an actuator adapted to produce a displacement of the platform with respect to the stationary part, wherein the actuator comprises:
   a first portion attached to the stationary part; and
   a second portion attached to the platform, wherein electrical bias of the first portion with respect to the second portion results in the displacement.

* * * * *

UNITED STATES PATENT AND TRADEMARK OFFICE
CERTIFICATE OF CORRECTION

PATENT NO. : 7,403,322 B2 Page 1 of 1
APPLICATION NO. : 11/225777
DATED : July 22, 2008
INVENTOR(S) : Dennis S. Greywall and Dan Mark Marom It is certified that error appears in the above-identified patent and that said Letters Patent is hereby corrected as shown below:

In Column 8, on line 11, replace "away" with --array--.

In Column 8, on line 12, replace "away" with --array--.

In Column 8, on line 14, replace "away" with --array--.

In Column 8, on line 15, replace "away" with --array--.

Signed and Sealed this

Third Day of February, 2009

JOHN DOLL
*Acting Director of the United States Patent and Trademark Office*